US012771772B1

(12) United States Patent
Fu et al.

(10) Patent No.: US 12,771,772 B1
(45) Date of Patent: Oct. 20, 2026

(54) PORTABLE ELECTRONIC APPARATUS

(71) Applicant: Honor Device Co., Ltd., Shenzhen (CN)

(72) Inventors: Zhenbiao Fu, Shenzhen (CN); Zhe Ma, Shenzhen (CN); Hongde Yang, Shenzhen (CN); Kangle Xue, Shenzhen (CN); Xijian Di, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 231 days.

(21) Appl. No.: 18/841,256

(22) PCT Filed: Apr. 25, 2023

(86) PCT No.: PCT/CN2023/090621
§ 371 (c)(1),
(2) Date: Aug. 23, 2024

(87) PCT Pub. No.: WO2024/041012
PCT Pub. Date: Feb. 29, 2024

(30) Foreign Application Priority Data

Aug. 24, 2022 (CN) ........................ 202211021683.X

(51) Int. Cl.
*H04M 1/03* (2006.01)
*G06F 1/16* (2006.01)
(Continued)

(52) U.S. Cl.
CPC .......... *H04M 1/035* (2013.01); *G06F 1/1688* (2013.01); *H04M 1/0264* (2013.01);
(Continued)

(58) Field of Classification Search
CPC .......................... H04R 2499/11; G06F 1/1688
See application file for complete search history.

(56) References Cited

U.S. PATENT DOCUMENTS

| | | | | |
|---|---|---|---|---|
| 12,355,910 | B2 * | 7/2025 | Shim | G06F 1/1626 |
| 12,439,189 | B2 * | 10/2025 | Ryu | H04R 1/04 |

(Continued)

FOREIGN PATENT DOCUMENTS

| | | | |
|---|---|---|---|
| CN | 202094955 | U | 12/2011 |
| CN | 209517216 | U | 10/2019 |

(Continued)

*Primary Examiner* — Patrick F Marinelli
(74) *Attorney, Agent, or Firm* — Slater Matsil, LLP

(57) ABSTRACT

This application provides a portable electronic apparatus, including a main body, a camera module, a noise-canceling microphone, and a sound pickup hole, where the main body includes a first side edge, a second side edge, and an outer surface, the first side edge and the second side edge are located on two opposite sides of the outer surface, the camera module is mounted on the main body and is exposed on the outer surface, the main body includes a circuit board, and the noise-canceling microphone is mounted on the circuit board; the sound pickup hole includes a sound receiving end and a sound output end, the sound receiving end runs through the outer surface, the sound receiving end is located on one side position of the outer surface and is close to the first side edge, and the sound output end is disposed on the circuit board and communicates with a sound output hole of the noise-canceling microphone; and the sound pickup hole is located between the camera module and the first side edge in a width direction of the portable electronic apparatus, and a distance from the sound pickup hole to the first side edge is less than a distance from the sound pickup hole to the second side edge.

20 Claims, 6 Drawing Sheets

(51) Int. Cl.
*H04M 1/02* (2006.01)
*H04M 1/19* (2006.01)
*H04R 1/02* (2006.01)
*H04R 1/34* (2006.01)

(52) U.S. Cl.
CPC ........... *H04M 1/0277* (2013.01); *H04M 1/19* (2013.01); *H04R 1/345* (2013.01); *H04R 1/025* (2013.01); *H04R 2499/11* (2013.01)

(56) References Cited

U.S. PATENT DOCUMENTS

| | | | | |
|---|---|---|---|---|
| 12,549,215 | B2 * | 2/2026 | Wu | H04B 1/3888 |
| 2016/0014488 | A1 | 1/2016 | Iwaya | |
| 2021/0037125 | A1 | 2/2021 | Jung et al. | |
| 2023/0261684 | A1 * | 8/2023 | Wu | H04B 1/3888<br>361/679.01 |
| 2024/0098397 | A1 * | 3/2024 | Noh | G06F 1/1626 |
| 2025/0220095 | A1 * | 7/2025 | Stobbe | H04M 1/026 |

FOREIGN PATENT DOCUMENTS

| | | | | | |
|---|---|---|---|---|---|
| CN | 110995907 | A | | 4/2020 | |
| CN | 210469408 | U | * | 5/2020 | |
| CN | 112291391 | A | | 1/2021 | |
| CN | 212305401 | U | | 1/2021 | |
| CN | 112738301 | A | | 4/2021 | |
| CN | 113259510 | A | | 8/2021 | |
| CN | 113497987 | A | | 10/2021 | |
| CN | 114430430 | A | * | 5/2022 | H04N 23/57 |
| JP | 2002330205 | A | | 11/2002 | |
| WO | 2021190198 | A1 | | 9/2021 | |

* cited by examiner

PORTABLE ELECTRONIC APPARATUS

CROSS-REFERENCE TO RELATED APPLICATIONS

This application is a national stage of International Application No. PCT/CN2023/090621, filed on Apr. 25, 2023, which claims priority to Chinese Patent Application No. 202211021683.X, filed on Aug. 24, 2022. The disclosures of both of the aforementioned applications are hereby incorporated by reference in their entireties.

TECHNICAL FIELD

This application relates to the technical field of mobile communication devices, and in particular, relates to a portable electronic apparatus.

BACKGROUND

As the most popular intelligent terminal devices, mobile phones have become an indispensable communication and entertainment tool in our lives. The ultimate pursuit of appearance and reliability in design and meeting more functions in smaller space have become a major trend of the mobile phones.

For example, in the conventional technology, to implement sound effect reliability of the mobile phone, an additional microphone is added on a back surface of a circuit board, to implement a high-quality sound effect together with an original acoustic apparatus. In actual design, the microphone is located on a mainboard, and a sound pickup channel needs to communicate with the outside of the mobile phone. Because there are many internal components and electronic components on the mainboard, a path of the sound pickup channel is complex. In limited space, this undoubtedly increases difficulty of design and stability.

SUMMARY

This application provides a portable electronic apparatus, to resolve a technical problem that stability of a sound receiving effect of a microphone cannot be ensured in limited space.

This application provides a portable electronic apparatus, including a main body, a camera module, a noise-canceling microphone, and a sound pickup hole, where the main body includes a first side edge, a second side edge, and an outer surface, the first side edge and the second side edge are located on two opposite sides of the outer surface, the camera module is mounted on the main body and is exposed on the outer surface, the main body includes a circuit board, and the noise-canceling microphone is mounted on the circuit board; the sound pickup hole includes a sound receiving end and a sound output end, the sound receiving end runs through the outer surface, the sound receiving end is located on one side position of the outer surface and is close to the first side edge, and the sound output end is disposed on the circuit board and communicates with a sound output hole of the noise-canceling microphone; and the sound pickup hole is located between the camera module and the first side edge in a width direction of the portable electronic apparatus, and a distance from the sound pickup hole to the first side edge is less than a distance from the sound pickup hole to the second side edge.

In this embodiment, it may be understood that the camera module is located at an upper left corner of the portable electronic apparatus, and a distance between the sound pickup hole and a first end edge is less than a distance between the sound pickup hole and a second end edge. The distance between the sound pickup hole and the first side edge is less than the distance between the sound pickup hole and the second side edge, and the sound pickup hole is located at a position between the camera module and the first side edge (at a sufficient distance from the camera module, to ensure that noise canceling can be achieved when a camera performs video recording). In addition, it may be understood that the sound pickup hole is located on an edge of the circuit board and an edge position of the mobile phone. Because there are a large quantity of elements and spring plates on the circuit board, the sound pickup hole is disposed on the edge of the circuit board, instead of a middle position thereof or within a camera assembly, so that there is no need to dispose a part of sound pickup holes at the middle position of the circuit board. This further facilitates layout and design of electronic elements on the circuit board, improves utilization of the circuit board, reduces use of internal space of the electronic apparatus, and saves internal space of the electronic apparatus.

In an embodiment, the sound pickup hole includes the sound receiving end, a sound pass-through gap, a third sub-hole, a second sub-hole, a connection gap, a first sub-hole, and the sound output end, and the sound receiving end, the sound pass-through gap, the third sub-hole, the second sub-hole, the connection gap, the first sub-hole, and the sound output end are sequentially communicated to form a hole structure that extends curvilinearly.

In this embodiment, the sound pickup hole is disposed as a hole structure that extends curvilinearly, so that space between internal structures of the electronic apparatus can be fully used, for example, arrangement and gaps between the middle frame, the circuit board, a bracket, and the camera module. This improves setting flexibility of a sound pickup position within a specific area.

In an embodiment, the sound receiving end is located at one end of the sound pass-through gap and runs through the outer surface, the sound output end is one end of the first sub-hole, the sound pass-through gap, the third sub-hole, the second sub-hole, the connection gap, the first sub-hole, and the sound output end are located inside the main body, axial directions of the first sub-hole, the second sub-hole, and the third sub-hole are parallel to a thickness direction of the portable electronic apparatus, both the third sub-hole and the second sub-hole are staggered from the first sub-hole, and the connection gap and the sound pass-through gap extend in the width direction of the portable electronic apparatus towards the first side edge. The sound pickup hole in this embodiment is not limited to a hole that needs to pass through a board, and gaps between the middle frame, the circuit board, the bracket, and a rear housing are also used. This simplifies a structure and further facilitates formation of the sound pickup hole.

In an embodiment, the main body includes a middle frame, a frame surrounding a peripheral edge of the middle frame, and a mainboard bracket, the first sub-hole runs through the circuit board, the second sub-hole runs through the mainboard bracket, and the connection gap is located between the mainboard bracket and the circuit board; and a clamping slot is concavely disposed on an inner side surface that is of the frame and that faces the mainboard bracket, a clamping buckle is disposed on the mainboard bracket, the clamping buckle is adjacent to the second sub-hole, and the clamping buckle extends in the width direction of the portable electronic apparatus; and the circuit board is disposed between the middle frame and the mainboard bracket, and the clamping buckle is clamped with the clamping slot.

In this embodiment, the mainboard bracket through which the second sub-hole runs and the frame that indirectly carries the mainboard bracket are clamped by using the clamping buckle and the clamping slot, so that mutual clamping force in a direction of a hole axis of the second sub-hole is increased. This may increase fastening force between the mainboard bracket and the middle frame in a thickness direction of the electronic apparatus, to enhance assembly tightness between the mainboard bracket, the circuit board, and the middle frame, so as to ensure sealing performance of the connection gap and the second sub-hole, and ensure sealing performance of the sound pickup hole, thereby ensuring a sound pickup effect.

In an embodiment, a connection hole is disposed on the mainboard bracket, the clamping buckle and the connection hole are respectively located on two opposite sides of the second sub-hole, a hole axis of the connection hole extends in a thickness direction of the portable electronic apparatus, and the connection hole is connected with a screw to fixedly connect the circuit board and the mainboard bracket. In this embodiment, the mainboard bracket through which the second sub-hole runs and the circuit board are directly fastened through connection by using a screw, and the connection hole connected with the screw and the clamping buckle are located on two opposite sides of the second sub-hole, to further improve assembly tightness between the mainboard bracket and the circuit board, so as to ensure sealing performance of the connection gap and the second sub-hole, and ensure sealing performance of the sound pickup hole, thereby ensuring a sound pickup effect.

In an embodiment, a spring plate is disposed on the circuit board, and the spring plate is adjacent to the first sub-hole; and the mainboard bracket includes a body and a blocking wall, the second sub-hole runs through two opposite surfaces of the body, the clamping buckle is located on one side of the body, and the blocking wall is disposed on the other side of the body and is opposite to the clamping buckle at an interval; and a cantilever is disposed on the blocking wall, a connection part between the cantilever and the body is a hollowed-out area, the hollowed-out area and the second sub-hole are spaced apart in the width direction of the portable electronic apparatus, the clamping buckle and the connection hole are respectively relatively opposite to blocking walls on two sides of the hollowed-out area at an interval, and the spring plate elastically abuts between the blocking wall and the circuit board.

In this embodiment, the mainboard bracket and the frame that indirectly carries the mainboard bracket are clamped by using the clamping buckle and the clamping slot, and elastic abutting force of the spring plate that elastically abuts between the blocking wall and the circuit board may be offset by the clamping force of clamping between the clamping buckle and the clamping slot, to prevent the elastic abutting force from pushing the mainboard bracket in a direction away from the circuit board, and avoid increasing a gap size of the connection gap. Further, the elastic force of the spring plate pushes the blocking wall in the direction away from the circuit board. Because the hollowed-out area and the second sub-hole are spaced apart in the width direction of the portable electronic apparatus, and the screw and the clamping buckle are located on two opposite sides of the second sub-hole, the elastic force bypasses the hollowed-out area and is transferred along the cantilever to both side positions of the hollowed-out area, so that the elastic force can be decomposed by using the screw and the clamping buckle, to further reduce reaction force on the mainboard bracket, so as to ensure sealing performance of the connection gap and the second sub-hole, thereby ensuring a sound pickup effect.

In an embodiment, the body includes a first surface and a second surface that faces away from the first surface, a groove is concavely disposed on the second surface, the second sub-hole runs through a groove bottom wall of the groove, and the groove communicates with the hollowed-out area, and is used to accommodate a sealing foam. In this embodiment, the sealing foam is placed in the groove to seal an end that is of the second sub-hole and that is away from the connection gap, and the sealing foam is sealed on a peripheral edge of an end part that is of the second sub-hole and that is located on the groove bottom wall of the groove, thereby improving sealing performance of the second sub-hole. In addition, the bracket in this embodiment presses against the sealing foam, so that the sealing foam has a better sealing effect. The sealing foam is disposed in the groove, and is not directly affected by insufficient fastening force between the bracket and the mainboard bracket, thereby further ensuring a sealing effect of the second sub-hole.

In an embodiment, a concave part is disposed on the first surface, the second sub-hole runs through a bottom of the concave part, the concave part and the groove overlap at least partially in the thickness direction of the portable electronic apparatus, and the connection gap is formed between the bottom of the concave part and a surface of the circuit board. In this embodiment, a gap between the circuit board connected to the second sub-hole and the mainboard bracket is divided into areas by using the concave part, that is, the connection gap is formed between the concave part and the surface of the circuit board, instead of directly disposing a gap between a plane and a plane, so that a gap area can be controlled, and sealing performance of the concave part is further facilitated, so as to further facilitate sealing performance of the concave part, thereby ensuring a sound pickup effect.

In an embodiment, the main body includes a rear housing mounted on the middle frame, the rear housing includes a housing body and a cover plate covering the housing body, the sound receiving end runs through a side edge of the cover plate, the sound pass-through gap is formed between the cover plate and an outer surface of the housing body in the thickness direction of the electronic apparatus, and the sound pass-through gap communicates with the sound receiving end.

In this embodiment, the sound pass-through gap is formed by using a gap between a rear cover and the cover plate that fastens the camera assembly, to be used as a part of the sound pickup hole, and the sound receiving end of the sound pickup hole is disposed at a side position of the rear housing, namely, a position that intersects the thickness direction of the electronic apparatus, to facilitate receiving of a sound pickup effect while fully using space.

In an embodiment, a bracket is disposed on a surface that is of the housing body and that faces away from the outer surface, the bracket supports the camera module, the third sub-hole runs through the housing body and an edge position of the bracket in the thickness direction of the electronic apparatus, one end of the third sub-hole is connected to the second sub-hole, and the other end thereof is connected to the sound pass-through gap. In this embodiment, the third sub-hole is disposed on an edge of the bracket and is close to the camera module. This helps ensure a sound effect during video recording by the camera.

In an embodiment, this application provides a portable electronic apparatus, including a middle frame, a frame surrounding a peripheral edge of the middle frame, a circuit board, a mainboard bracket, a noise-canceling microphone, and a sound pickup hole, where the circuit board includes a front surface and a back surface, and a spring plate is disposed on the back surface;

the sound pickup hole includes a first sub-hole, a connection gap, and a second sub-hole that are sequentially communicated, the first sub-hole runs through the front surface and the back surface and is adjacent to the spring plate, and the second sub-hole runs through the mainboard bracket;

a clamping buckle and a connection hole are disposed on the mainboard bracket, the clamping buckle and the connection hole are respectively located on two opposite sides of the second sub-hole, the clamping buckle extends in a width direction of the portable electronic apparatus, a hole axis of the connection hole extends in a thickness direction of the portable electronic apparatus, and a clamping slot is concavely disposed on an inner side surface that is of the frame and that faces the mainboard bracket; and the noise-canceling microphone is mounted on the front surface of the circuit board and communicates with one end of the first sub-hole, the circuit board is disposed between the middle frame and the mainboard bracket, the connection gap is formed between the mainboard bracket and the circuit board, the spring plate elastically abuts between the circuit board and the mainboard bracket, the clamping buckle is clamped with the clamping slot, and the connection hole is connected with a screw to fixedly connect the circuit board and the mainboard bracket.

In this embodiment, the mainboard bracket and the frame are clamped by using the clamping buckle and the clamping slot, and the mainboard bracket and the circuit board are thread-connected by using the screw. The connection hole connected with the screw and the clamping buckle are located on two opposite sides of the second sub-hole, and elastic abutting force of the spring plate that elastically abuts between the mainboard bracket and the circuit board may be offset by the clamping force of clamping between the clamping buckle and the clamping slot, to prevent the elastic abutting force from pushing the mainboard bracket in a direction away from the circuit board, and avoid increasing a gap size of the connection gap, so as to ensure sealing performance of the sound pickup hole, thereby ensuring a sound pickup effect.

In an embodiment, the mainboard bracket includes a body and a blocking wall, the second sub-hole runs through two opposite surfaces of the body, the clamping buckle is located on one side of the body, and the blocking wall is disposed on the other side of the body and is opposite to the clamping buckle at an interval; and a cantilever is disposed on the blocking wall, a connection part between the cantilever and the body is a hollowed-out area, the hollowed-out area and the second sub-hole are spaced apart in the width direction of the portable electronic apparatus, the clamping buckle and the connection hole are respectively relatively opposite to blocking walls on two sides of the hollowed-out area at an interval, and the spring plate elastically abuts between the blocking wall and the circuit board. In this embodiment, the elastic force of the spring plate pushes the blocking wall in the direction away from the circuit board. Because the hollowed-out area and the second sub-hole are spaced apart in the width direction of the portable electronic apparatus, and the screw and the clamping buckle are located on two opposite sides of the second sub-hole, the elastic force bypasses the hollowed-out area and is transferred along the cantilever to both side positions of the hollowed-out area, so that the elastic force can be decomposed by using the screw and the clamping buckle, to further reduce reaction force on the circuit board, so as to ensure sealing performance of the connection gap and the second sub-hole, thereby ensuring a sound pickup effect.

In an embodiment, the body includes a first surface and a second surface that faces away from the first surface, a groove is concavely disposed on the second surface, the second sub-hole runs through a groove bottom wall of the groove, and the groove communicates with the hollowed-out area, and is used to accommodate a sealing foam. In this embodiment, the sealing foam is placed in the groove to seal an end that is of the second sub-hole and that is away from the connection gap, and the sealing foam is sealed on a peripheral edge of an end part that is of the second sub-hole and that is located on the groove bottom wall of the groove, thereby improving sealing performance of the second sub-hole. In addition, the bracket in this embodiment presses against the sealing foam, so that the sealing foam has a better sealing effect. The sealing foam is disposed in the groove, and is not directly affected by insufficient fastening force between the bracket and the mainboard bracket, thereby further ensuring a sealing effect of the second sub-hole.

In an embodiment, a concave part is disposed on the first surface, the second sub-hole runs through a bottom of the concave part, the concave part and the groove overlap at least partially in the thickness direction of the portable electronic apparatus, and the connection gap is formed between the bottom of the concave part and a surface of the circuit board. In this embodiment, a gap between the circuit board connected to the second sub-hole and the mainboard bracket is divided into areas by using the concave part, that is, the connection gap is formed between the concave part and the surface of the circuit board, instead of directly disposing a gap between a plane and a plane, so that a gap area can be controlled, and sealing performance of the concave part is further facilitated, so as to further facilitate sealing performance of the concave part, thereby ensuring a sound pickup effect.

In an embodiment, the sound pickup hole includes the sound receiving end and a sound pass-through gap, the main body includes a rear housing mounted on the middle frame, the rear housing includes a housing body and a cover plate covering the housing body, the sound receiving end runs through a side edge of the cover plate, the sound pass-through gap is formed between the cover plate and an outer surface of the housing body in the thickness direction of the electronic apparatus, and the sound pass-through gap communicates with the sound receiving end.

In this embodiment, the sound pass-through gap is formed by using a gap between a rear cover and the cover plate that fastens the camera assembly, to be used as a part of the sound pickup hole, and the sound receiving end of the sound pickup hole is disposed at a side position of the rear housing, namely, a position that intersects the thickness direction of the electronic apparatus, to facilitate receiving of a sound pickup effect while fully using space.

In an embodiment, the sound pickup hole includes a third sub-hole, a bracket is disposed on a surface that is of the housing body and that faces away from the outer surface, the bracket supports the camera module, the third sub-hole runs through the housing body and an edge position of the bracket in the thickness direction of the electronic apparatus, one end of the third sub-hole is connected to the second sub-hole, and the other end thereof is connected to the sound pass-through gap. In this embodiment, the third sub-hole is disposed on an edge of the bracket and is close to the camera module. This helps ensure a sound effect during video recording by the camera.

According to the portable electronic apparatus described in this application, the sound pickup hole is disposed on the edge of the circuit board, instead of the middle position thereof or within the camera assembly, so that there is no need to dispose a part of sound pickup holes at the middle position of the circuit board. This further facilitates layout and design of electronic elements on the circuit board, improves utilization of the circuit board, reduces use of internal space of the electronic apparatus, and saves internal space of the electronic apparatus.

BRIEF DESCRIPTION OF THE DRAWINGS

To describe technical solutions in embodiments or the background of this application more clearly, the following describes accompanying drawings required in the embodiments or the background of this application.

DETAILED DESCRIPTION OF ILLUSTRATIVE EMBODIMENTS

In the description of this application, orientation or position relationships indicated by the terms “center”, “up”, “down”, “front”, “back”, “left”, “right”, “vertical”, “horizontal”, “top”, “bottom”, “inside”, “outside”, “longitudinal”, and “lateral”, and the like are orientation or position relationships shown based on the accompanying drawings, and are merely intended for convenience of describing this application and simplifying the description, rather than indicating or implying that the indicated apparatus or element needs to have a specific orientation and be constructed and operated in a specific orientation, and therefore should not be understood as a limitation on this application. The terms “first” and “second” below are merely intended for a purpose of description, and shall not be understood as an indication or implication of relative importance or implicit indication of the quantity of indicated technical features. Therefore, a feature defined by “first”, “second”, and the like may explicitly or implicitly include one or more such features.

This application provides a portable electronic apparatus, including a main body, a camera module, a noise-canceling microphone, and a sound pickup hole, where the main body includes a first side edge, a second side edge, and an outer surface, the first side edge and the second side edge are located on two opposite sides of the outer surface, the camera module is mounted on the main body and is exposed on the outer surface, the main body includes a circuit board, and the noise-canceling microphone is mounted on the circuit board; the sound pickup hole includes a sound receiving end and a sound output end, the sound receiving end runs through the outer surface, the sound receiving end is located on one side position of the outer surface and is close to the first side edge, and the sound output end is disposed on the circuit board and communicates with a sound output hole of the noise-canceling microphone; and the sound pickup hole is located between the camera module and the first side edge in a width direction of the portable electronic apparatus, and a distance from the sound pickup hole to the first side edge is less than a distance from the sound pickup hole to the second side edge.

The following describes technical solutions in embodiments of this application with reference to the accompanying drawings in the embodiments of this application. It is clear that the described embodiments are some but not all of the embodiments of this application.

Figure 1:
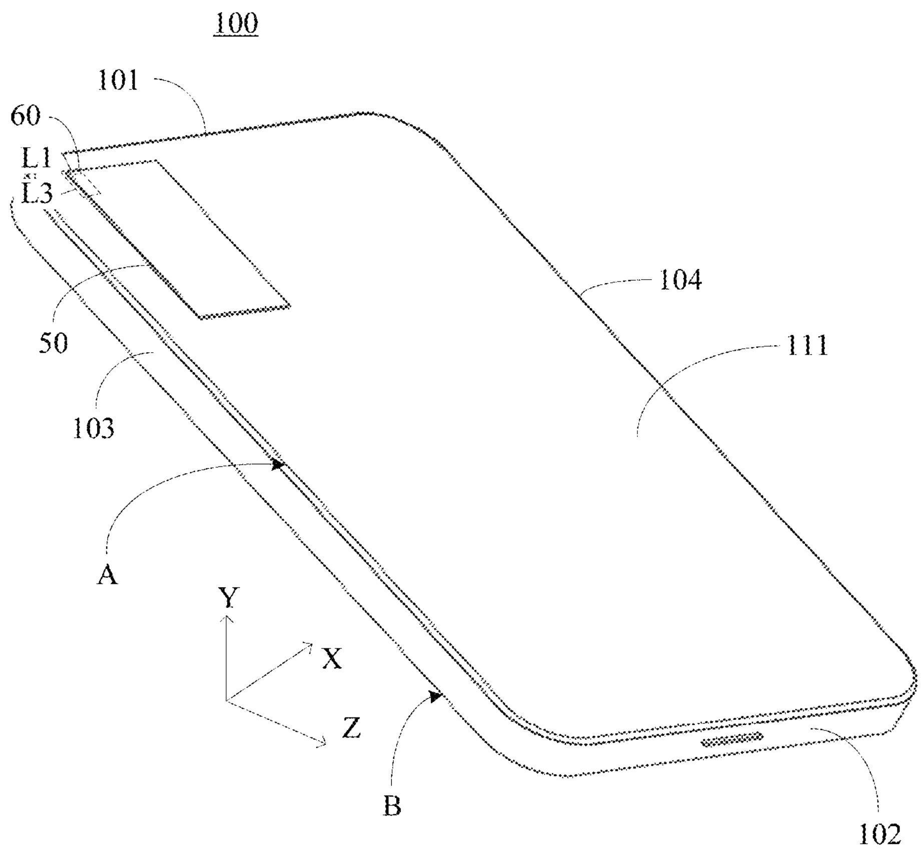
FIG. 1 is a schematic diagram of a three-dimensional structure of a portable electronic apparatus according to an embodiment of this application.
Figure 2:
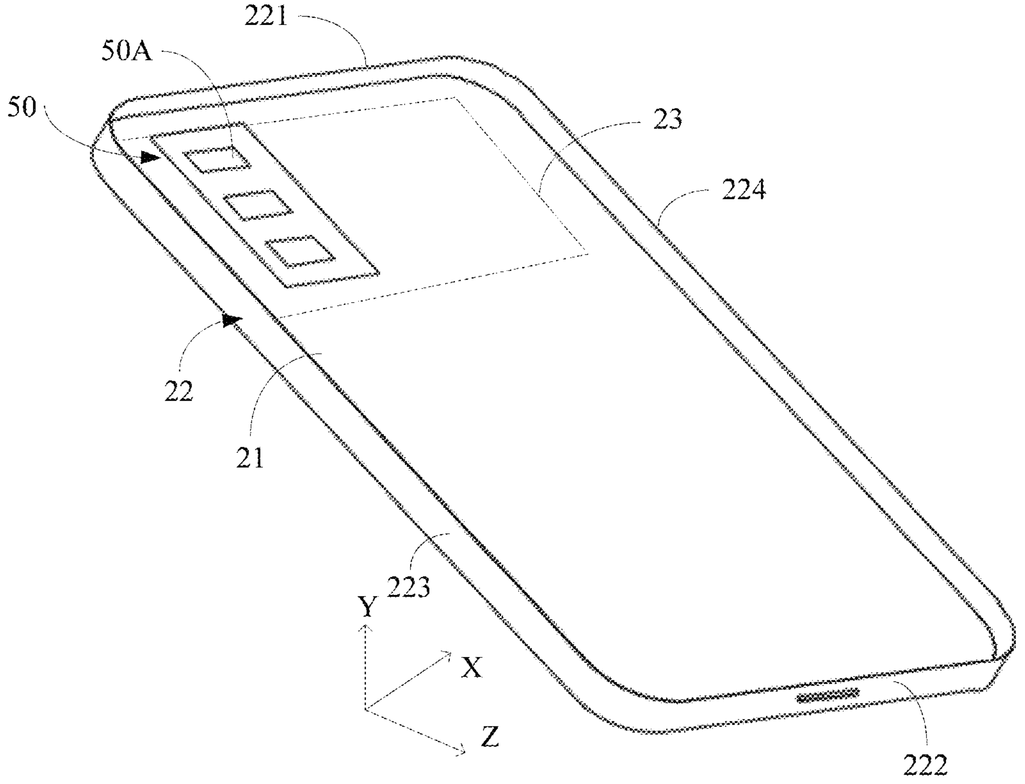
FIG. 2 is a schematic diagram of a partial structure of the portable electronic apparatus shown in FIG. 1.

Referring to FIG. 1 and FIG. 2, FIG. 1 is a schematic diagram of a structure of a portable electronic apparatus 100 according to an embodiment of this application. FIG. 2 is a schematic diagram of a partial structure of the portable electronic apparatus 100 shown in FIG. 1, where a rear housing is removed. The portable electronic apparatus may be an electronic product that has functions such as audio playing and recording, for example, a mobile phone, a tablet computer, a headset, an audio player, and a smartwatch. In this embodiment of this application, an example in which the portable electronic apparatus 100 is a mobile phone is used for description. For ease of description, a width direction of the portable electronic apparatus 100 is defined as an X-axis direction, a thickness direction thereof is defined as a Y-axis direction, that is, an arrangement direction of a main body A and a display screen B, and a width length direction of the portable electronic apparatus 100 is defined as a Z-axis direction.

The portable electronic apparatus 100 includes the main body A, the display screen B, a camera assembly 50, a microphone module, and a sound pickup hole 60. The display screen B is mounted on one side of the main body A, and the camera assembly 50 is mounted on the other side of the main body A. The display screen B is used to operate the mobile phone and display a function interface of the mobile phone, an image, and a video. The display screen B may be an organic light-emitting diode OLED (Organic Light-Emitting Diode) display, or certainly may be a liquid crystal display. In this embodiment, the display screen is an OLED display.

The camera assembly 50 includes two or more camera modules 50A and a flash light, to perform photographing and video recording functions of the mobile phone. The camera assembly 50 in this embodiment includes three camera modules 50A, and the three camera modules are arranged at a position of a left side edge or a right side edge that is of the main body A and that is close to the top. For example, the first camera module 50A is a primary camera, and the second and third camera modules are auxiliary cameras, and may be a depth of field camera, a long-focus/wide-angle camera, a black and white camera, or the like. It should be noted that the three cameras are only an example, and may be arranged side by side or surround to form a ring.

The main body A of the portable electronic apparatus 100 includes a top edge 101, a bottom edge 102, a first side edge 103, and a second side edge 104. A sound output hole used to produce sound is disposed on the top edge 101. A microphone sound hole, a connector socket, and the like are disposed on the bottom edge 102. When a user talks by using the mobile phone, the top edge 101 corresponds to the ear of the user, and the bottom edge 102 corresponds to the mouth of the person, to facilitate mutual propagation of volume. Certainly, the sound output hole and the microphone sound hole may also be applied to sound propagation of an external playing function. In this embodiment, only some function components of the mobile phone are enumerated. The top edge 101 and the bottom edge 102 each may further include another structure such as a function hole and a key. This not limited to the description in this embodiment. The first side edge 103 and the second side edge 104 are used to dispose a volume key or a power-off key of the mobile phone. It may be understood that, after the display screen B is mounted on the main body A, the top edge 101 and the bottom edge 102 of the main body are also the top and the bottom of the portable electronic apparatus 100, and the first side edge 103 and the second edge 104 are also two sides of the portable electronic apparatus 100.

Figure 3:
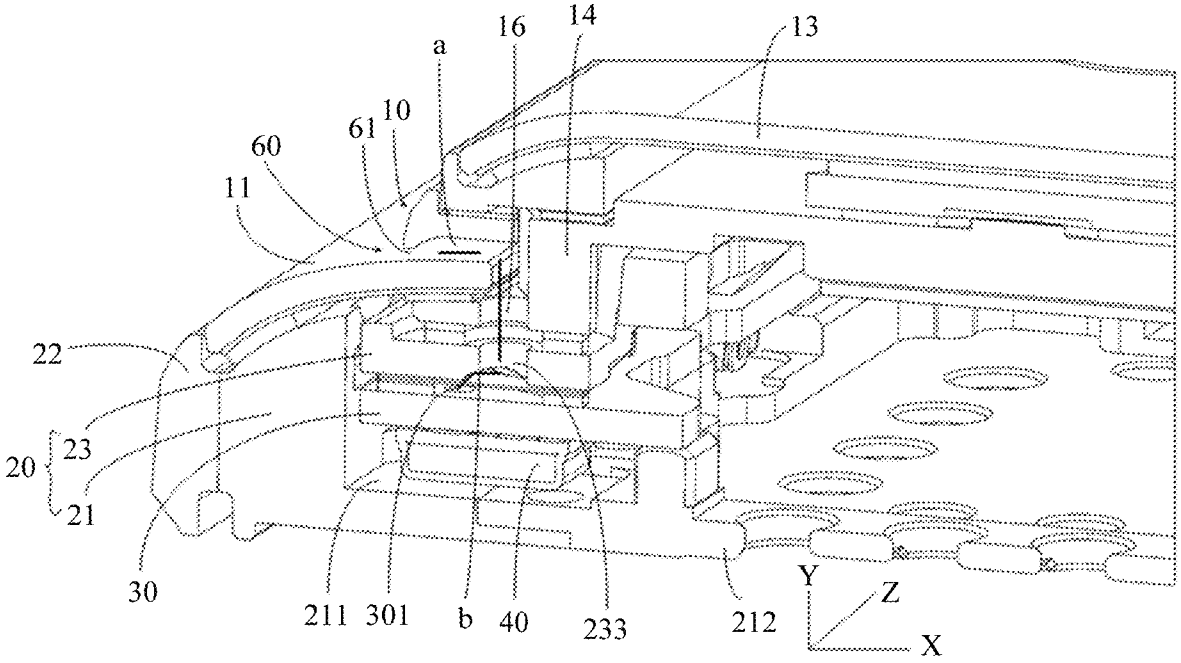
FIG. 3 is a cross-sectional schematic view of the portable electronic apparatus, shown in FIG. 1, from a perspective.

Referring to FIG. 3, FIG. 3 is a cross-sectional schematic view of the portable electronic apparatus, shown in FIG. 1, from a perspective. The main body A further includes a rear housing 10, a middle frame assembly 20, and a circuit board 30. Certainly, the main body A does not merely include the enumerated components, and further includes components such as a speaker, an antenna, and a processor, to meet multi-function performance of an existing mobile phone. Details are not described herein. The middle frame assembly 20 is used to carry the rear housing 10, the circuit board 30, the microphone module, the display screen B, and the camera assembly 50. The rear housing 10 and the display screen B are located on two opposite side positions of the middle frame assembly 20, and the rear housing 10 is located on the back of the portable electronic apparatus 100. The microphone module is located on a side that is of the circuit board 30 and that faces away from the rear housing 10, and is electrically connected to the circuit board 30. The camera assembly 50 is located on a side that is of the main body A and that faces away from the display screen B, and is exposed on the rear housing 10. The sound pickup hole 60 is located inside the main body A and communicates with the outside of the mobile phone.

In this embodiment, the microphone module includes a primary microphone (not shown in the figure), a secondary microphone (not shown in the figure), and a noise-canceling microphone 40. The primary microphone and the secondary microphone are respectively located at positions that are in the main body A and that are close to the top edge 101 and the bottom edge 102, and the mobile phone is further provided with a speaker (not shown in the figure) for playing audio. The speaker is located at a position that is in the main body A and that is close to the top edge 101, and corresponds to the sound output hole. The primary microphone is used to pick up external audio (including a noise canceling function) when the mobile phone performs functions such as recording and video recording, and the sound pickup hole is disposed on the top edge 101 or the back of the main body to correspond to the primary microphone, so as to allow volume to pass through. The secondary microphone corresponds to the microphone sound hole, and is generally used to pick up speech audio during talking by using the mobile phone. The noise-canceling microphone is used to work simultaneously with the primary microphone to pick up external noise for noise canceling. The noise-canceling microphone 40 may work simultaneously with the primary microphone to pick up external noise for noise canceling.

The sound pickup hole includes the sound receiving end, a sound pass-through gap, a third sub-hole, a second sub-hole, a connection gap, a first sub-hole, and the sound output end, and the sound receiving end, the sound pass-through gap, the third sub-hole, the second sub-hole, the connection gap, the first sub-hole, and the sound output end are sequentially communicated to form a hole structure that extends curvilinearly. In this embodiment, the sound pickup hole is disposed as a hole structure that extends curvilinearly, so that space between internal structures of the electronic apparatus can be fully used, for example, arrangement and gaps between the middle frame, the circuit board, a bracket, and the camera module. This improves setting flexibility of a sound pickup position within a specific area.

Specifically, the sound pickup hole 60 includes a sound receiving end 61 and a sound output end. The sound pickup hole 60 runs through the rear housing 10, the middle frame assembly 20, and the circuit board 30. The sound receiving end 61 is located on the rear housing 10. The sound output end is located inside the main body A, is connected to the noise-canceling microphone 40 of the microphone module, and is used for sound pickup by the noise-canceling microphone 40. In this embodiment, the sound pickup hole 60 is disposed on a side of the camera assembly 50, so that noise is removed when a camera performs video recording and recording.

In this embodiment, the rear housing 10 includes a housing body 11, a cover plate 13, and a third sub-hole 16. The housing body 11 is a rectangular thin plate, may be used as a battery cover of the mobile phone, and is also an exterior part on the back of the mobile phone.

Specifically, the housing body 11 includes an outer surface 111 and a back surface (not shown in the figure) that faces away from the outer surface 111. A hole (not shown in the figure) that runs through the outer surface 111 and the back surface is further disposed on the housing body 11. The hole is located at a corner position of the housing body 11, and is used to accommodate the camera assembly 50. It may also be understood that the camera assembly 50 is located at a position of an upper left corner of the main body A.

A bracket 14 is fastened to the back surface of the housing body 11, and is used to support the camera assembly 50, to fasten the support camera assembly 50 to the rear housing 10. It may be understood that the bracket 14 may be a part of the housing body 11, and is integrally formed with the housing body 11, or may be fastened to the housing body 11 through connection. In this embodiment, a part of the bracket 14 is located in the hole, and a side that is of the cover plate 13 and that is located on the outer surface 111 is mounted on the hole, to cover a partial structure of the camera assembly 50, so as to prevent an internal structure of the camera assembly from affecting appearance of the electronic apparatus. In addition, the cover plate 13 may be further used to allow light to pass through or expose a lens of the camera module.

The third sub-hole 16 runs through the outer surface 111 and the back surface in a thickness direction of the rear housing 10, and specifically runs through the bracket 14 and a part of the housing body 11. It may also be understood that the third sub-hole 16 runs through the housing body 11 or the rear housing 10.

Figure 6:
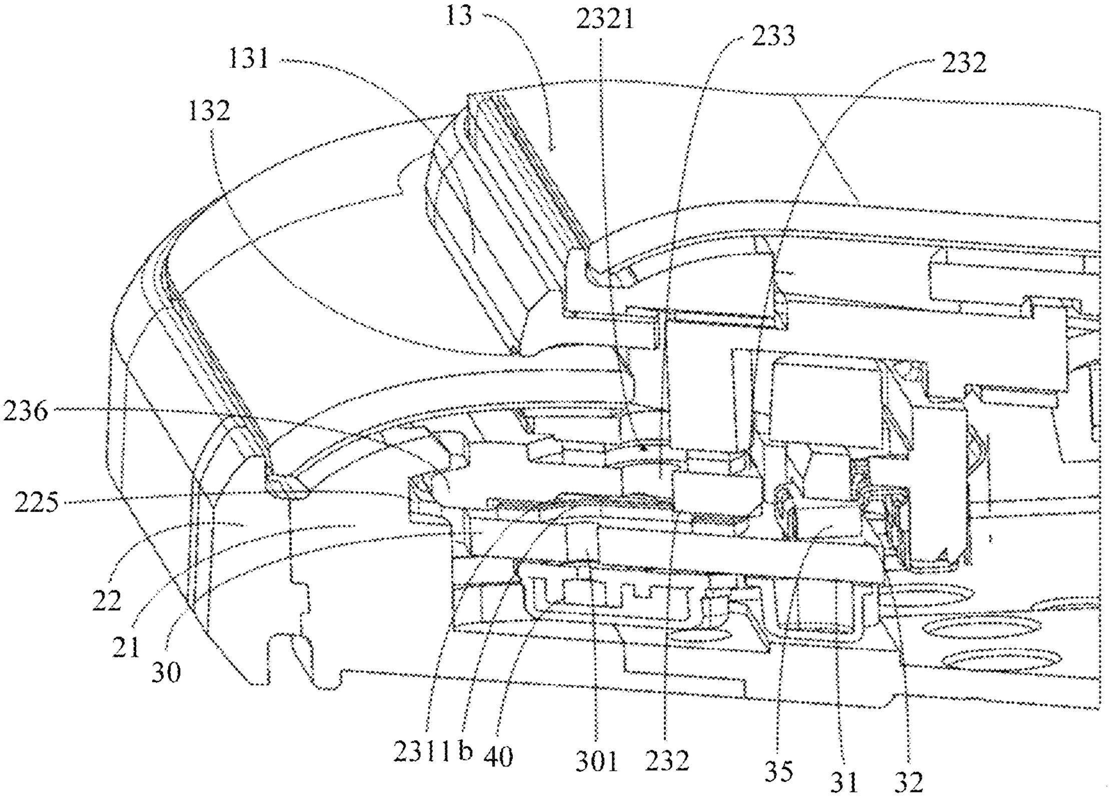
FIG. 6 is a cross-sectional schematic view of the portable electronic apparatus, shown in FIG. 1, from a perspective.

As shown in FIG. 6, FIG. 6 is a cross-sectional schematic view of the portable electronic apparatus, shown in FIG. 1, from a perspective. A connection edge 131 is disposed on a peripheral edge of the cover plate 13 through bending, and a notch 132 is disposed on the connection edge 131. After the cover plate 13 is mounted on the hole of the housing body 11, the connection edge 131 is connected to and sealed with the outer surface 111 around the hole. There is a sound pass-through gap a extending in the X-axis direction between the cover plate 13 and the outer surface 111 of the housing body 11, the sound receiving end 61 is surrounded by the notch 132 and the outer surface 111, and the sound receiving end 61 communicates with the sound pass-through gap a. In this embodiment, the sound receiving end 61 faces the first side edge 103 of the portable electronic apparatus 100. Certainly, the sound receiving end 61 may face a position of the top edge 101. An outer surface of the cover plate 13 and the outer surface 111 may be understood as an outer surface of the back of the main body A or the mobile phone, and the sound receiving end 61 runs through the outer surface.

Figure 4:
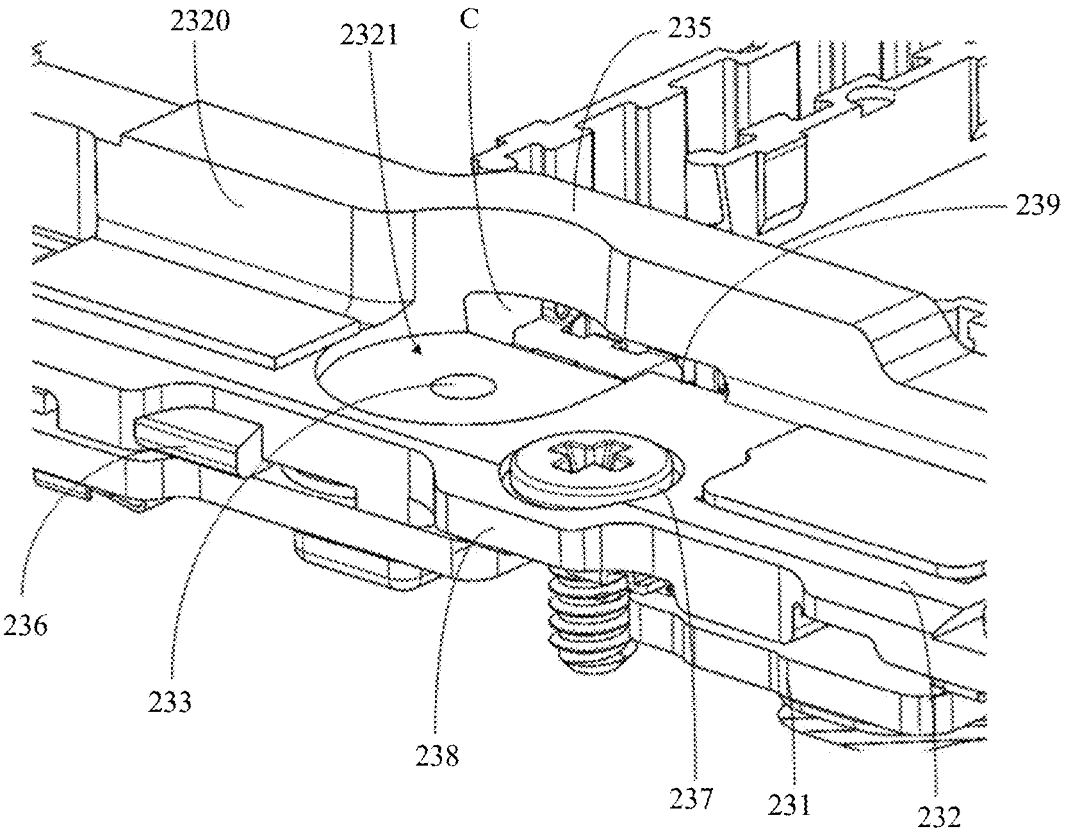
FIG. 4 is a schematic diagram of a partial internal structure of the portable electronic apparatus shown in FIG. 1.

Referring to FIG. 3 and FIG. 4, FIG. 4 is a schematic diagram of a partial internal structure of the portable electronic apparatus shown in FIG. 1. The circuit board 30 is a board body, and includes a front surface 31 and a back surface 32 that faces away from the front surface 31. A wiring layer is disposed in the circuit board 30, and the wiring layer is exposed on the front surface 31, is used to be electrically connected to an electronic component such as a central processing unit mounted on the front surface 31, and is used to be electrically connected to an external component such as a camera and a speaker. A plurality of spring plates 35 are disposed on the front surface 31 and the back surface 32, and are used for grounding or conduction. The back surface 32 may also be used to mount an electronic component.

In this embodiment, the noise-canceling microphone 40 is mounted on the front surface 31 and is electrically connected to the circuit board 30. In this embodiment, a first sub-hole 301 is further disposed on the circuit board 30, and the first sub-hole 301 runs through the front surface 31 and the back surface 32. The first sub-hole 301 is used to be opposite to and communicate with the third sub-hole 16. The first sub-hole 301 is located at a position of a side edge of the circuit board 30 and avoids the spring plate 35. There are a small quantity of spring plates 35 on a side edge of the circuit board 30. It may be understood that the first sub-hole 301 avoids the electronic component and the spring plate on the circuit board 30. The first sub-hole 301 is disposed on the edge of the circuit board 30, instead of a middle position thereof or within the camera assembly, so that there is no need to dispose a part of sound pickup holes at the middle position of the circuit board 30. This further facilitates layout and design of electronic elements on the circuit board 30, improves utilization of the circuit board, reduces use of internal space of the electronic apparatus, and saves internal space of the electronic apparatus.

Figure 5:
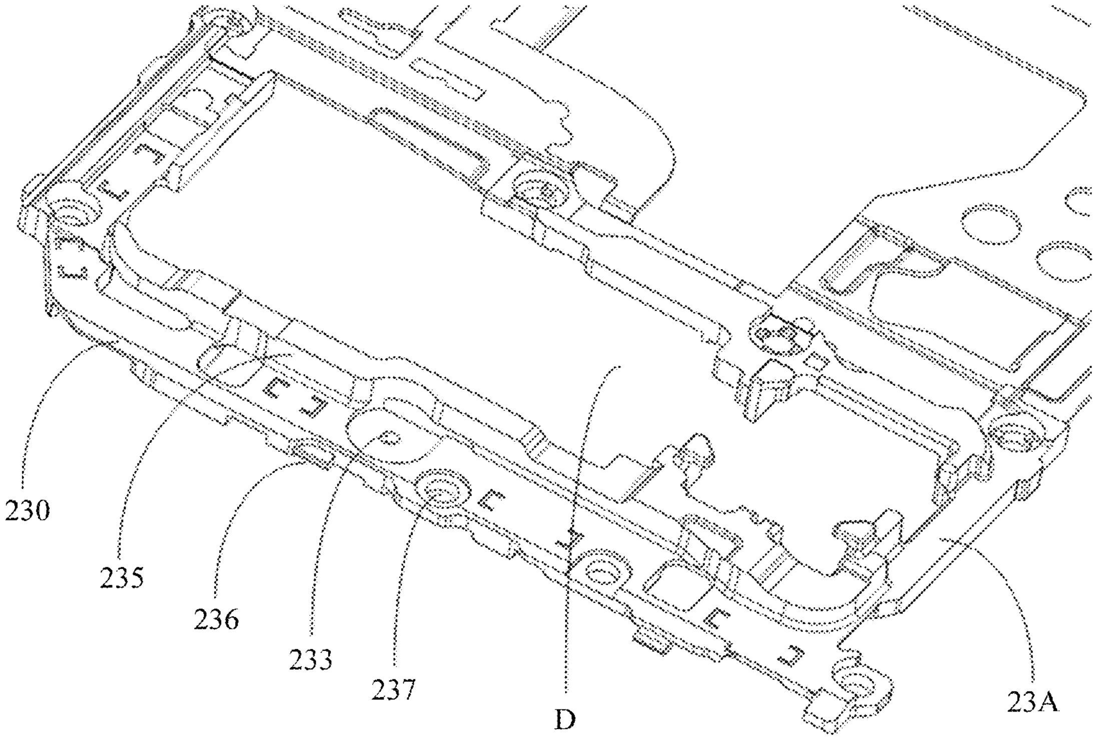
FIG. 5 is a schematic diagram of a structure of a main-board bracket of the portable electronic apparatus shown in FIG. 1.

Referring to FIG. 5, FIG. 5 is a schematic diagram of a structure of a mainboard bracket of the portable electronic apparatus shown in FIG. 1. The middle frame assembly 20 includes a middle frame 21, a frame 22, and a mainboard bracket 23. The middle frame 21 as a whole is a substantially rectangular plate body, and includes a first side (a side on which the first side edge 103 is located) and a second side 212 (a side on which the second side edge 104 is located) that faces away from the first side 211. The frame 22 is a rectangular frame structure, and is disposed around a peripheral edge of the middle frame 21. In this embodiment, the middle frame 21 is a metal member, the frame 22 is a plastic member, and the frame 22 and the middle frame 21 are formed integrally. The mainboard bracket 23 is fastened to the first side 211 of the middle frame 21. It may be understood that the mainboard bracket 23 is a part of the middle frame 21, and may be integrally formed with the middle frame 21. The mainboard bracket 23 is used to support the circuit board 30.

Specifically, as shown in FIG. 2, the frame 22 includes a first end edge 221, a second end edge 222, a first side edge 223, and a second edge 224. The first end edge 221 and the second end edge 222 are opposite to each other in the Z-axis direction at an interval, and the first side edge 223 and the second side edge 224 are opposite to each other in the X-axis direction at an interval. The first end edge 221, the second end edge 222, the first side edge 223, and the second edge 224 are head-to-tail connected to form a frame body. The first end edge 221 is connected to one end of the middle frame 21, and the second end edge 222 is connected to the other end of the middle frame 21. The first side edge 223 is connected to one side edge of the middle frame 21, and the second side edge 224 is connected to the other side edge of the middle frame 21. The first end edge 221 is used as the top edge 101 of the main body A, is located at a top position of the portable electronic apparatus 100, and is used as a top housing. The second end edge 222 is used as the bottom edge 102 of the main body A, is located at a bottom position of the portable electronic apparatus 100, and is used as a bottom housing. The first side edge 223 is used as the first side edge 103 of the main body A, is located at one side position of the portable electronic apparatus 100, and is used as a side housing. The second side edge 224 is used as the second side edge 104 of the main body A, is located at one side position of the portable electronic apparatus 100, and is used as a side housing.

Referring to FIG. 5, in this embodiment, the mainboard bracket 23 includes a body 230, and a cantilever 235, a clamping buckle 236, a second sub-hole 233, and a connection hole 237 that are disposed on the body 230.

Specifically, the body 230 includes a first surface 231, a second surface 232 that faces away from the first surface 231, a first side 238, and a second side 239 opposite to the first side 238. Both the first side 238 and the second side 239 are connected to the first surface 231 and the second surface 232. The second sub-hole 233 runs through the first surface 231 and the second surface 232. The second sub-hole 233 is used to communicate with the first sub-hole 301. The communication means that the first sub-hole 301 and the second sub-hole 233 relatively communicate with each other along a same hole axis, or communicate with each other through staggering. The connection hole 237 runs through the first surface 231 and the second surface 232, and the connection hole 237 is spaced apart from the second sub-hole 233 in the Z direction.

A concave part 2311 is concavely disposed on the first surface 231, the concave part 2311 is used to form a connection gap b between the concave part 2311 and the back surface 32 of the circuit board, and the connection gap b is used to communicate the second sub-hole 233 with the first sub-hole 301. The second sub-hole 233 runs through a bottom wall of the concave part 2311. A groove 2321 is concavely disposed on the second surface 232, and the groove 2321 is used to accommodate a sealing foam, to implement sealing on some sound pickup holes. In this embodiment, the concave part 2311 and the groove 2321 overlap at least partially in the Y-axis direction, and the second sub-hole 233 (in the Y-direction) runs through the bottom wall of the concave part 2311 and a groove bottom wall of the groove 2321. The concave part 2311 is closer to the first side 238, and is used to adapt to a position of the first sub-hole 301 on the circuit board 30.

In this embodiment, the sealing foam is placed in the groove 2321 to seal an end that is of the second sub-hole and that is away from the connection gap, and the sealing foam is sealed on a peripheral edge of an end part that is of the second sub-hole 233 and that is located on the groove bottom wall of the groove 2321, thereby improving sealing performance of the second sub-hole 233. In addition, the bracket in this embodiment presses against the sealing foam, so that the sealing foam has a better sealing effect. The sealing foam is disposed in the groove, and is not directly affected by insufficient fastening force between the bracket and the mainboard bracket 23, thereby further ensuring a sealing effect of the second sub-hole 233. The groove 2321 in this embodiment communicates with a hollowed-out area.

The clamping buckle 236 is disposed on an edge that is the first surface 231 and that is connected to the first side 238, and is located on a side that is of the groove 2321 and that is away from the connection hole 237. The clamping buckle 236 extends in a direction parallel to the first surface 231, and protrudes from the first side 238, that is, the clamping buckle 236 protrudes from the first side 238. A clamping slot 225 is concavely disposed on a surface that is of the first side edge 223 of the frame 22 and that faces the middle frame 21. After the mainboard bracket 23 is mounted on the middle frame 21, the clamping buckle 236 extends into the clamping slot 225 to be clamped with the clamping slot 225, so as to prevent the mainboard bracket 23 from moving away from the circuit board in the Y-axis direction.

In this embodiment, the mainboard bracket 23 through which the second sub-hole 233 runs and the circuit board 30 are directly fastened through connection by using a screw, and the connection hole 237 connected with the screw and the clamping buckle 236 are located on two opposite sides of the second sub-hole 233, to further improve assembly tightness between the mainboard bracket 23 and the circuit board 30, so as to ensure sealing performance of the connection gap b and the second sub-hole 233, and ensure sealing performance of the sound pickup hole 60, thereby ensuring a sound pickup effect.

A blocking wall 2320 extending in a length direction of the second surface 232 is convexly disposed on the second surface 232, and the blocking wall 2320 is close to the second side 239. There is a hollowed-out area C at a connection part between the blocking wall 2320 and the body 230, and the cantilever 235 is formed at a position that is on the blocking wall 2320 and that corresponds to the hollowed-out area C, that is, when the hollowed-out area Cis formed on the blocking wall 2320, the remaining part is the cantilever 235. It may be understood that the cantilever 235 is spaced apart from the first surface 231 of the body 230 by using the hollowed-out area C, and the cantilever 235 is located above one side of the groove 2321. The hollowed-out area C in this embodiment runs through the blocking wall 2320 and is connected to the groove 2321, and a direction in which the hollowed-out area C runs through the blocking wall intersects an extension direction of the blocking wall 2320. In other embodiments, that the hollowed-out area C runs through the blocking wall 2320 may be that the hollowed-out area C runs through a part of the body 230 and a part of the blocking wall 2320. It may be understood that the blocking wall 2320 has a notch, and the notch divides the blocking wall 2320 into two parts. The cantilever 235 is located in the notch and is connected to the blocking wall parts on two sides of the notch. A length direction of the cantilever 235 is the X-axis direction. The cantilever 235 and the body 230 are spaced apart from each other by using a part of the notch.

In this embodiment, the mainboard bracket 23 and the frame 22 that indirectly carries the mainboard bracket 23 are clamped by using the clamping buckle 236 and the clamping slot 225, and elastic abutting force of the spring plate 35 that elastically abuts between the blocking wall 2320 and the circuit board 30 may be offset by the clamping force of clamping between the clamping buckle 236 and the clamping slot 225, to prevent the elastic abutting force from pushing the mainboard bracket 23 in a direction away from the circuit board, and avoid increasing a gap size of the connection gap b.

The mainboard bracket 23 includes an extension arm 23A. The extension arm 23A is connected to the second side 239 of the body 230, and the extension arm 23A and the mainboard bracket 23 surround a substantially rectangular avoidance groove D, to avoid the camera assembly 50. It may be understood that the mainboard bracket 23 is a thin plate, and the avoidance groove is disposed on the thin plate to form the body 230 and the extension arm 23A.

The mainboard bracket 23 is fastened to the middle frame 21 near the first end edge 221 and the first side edge 223. The first surface 231 of the mainboard bracket 23 faces a same direction as the first side 211, and the second surface 232 thereof faces a same direction as the second side 212. It may be understood that the mainboard bracket 23 may be built in the middle frame 21, and may be supported by the middle frame 21. In this embodiment, the mainboard bracket 23 is supported by the middle frame 21.

The circuit board 30 and the display screen B are located on the first side 211, and the display screen B is supported by the middle frame 21 and the frame 22. The camera assembly 50 and the rear housing 10 are located on the second side 212, and the rear housing 10 covers the second side 212 of the middle frame 21 and is connected to the frame 22. The cover plate 13 limits the camera assembly 50 to the main body A. The bracket 14 of the camera assembly 50 abuts against the second surface 232 of the mainboard bracket 23, and a sealing foam is placed in the groove 2321, and the bracket 14 partially squeezes the sealing foam, to implement a sealing effect on a peripheral edge of the second sub-hole 233. The circuit board 30 is supported by the mainboard bracket 23 and a part of the middle frame 21. The first surface 231 faces the back surface 32 of the circuit board 30. A screw is mounted on the connection hole 237 disposed on the body 230. The circuit board 30 and the mainboard bracket 23 are thread-connected by using the screw, so that the circuit board 30 and the mainboard bracket 23 are locked relative to each other in the Y direction. In addition, the clamping buckle 236 extends into the clamping slot 225 of the frame 22 to be clamped with the clamping slot 225.

In this embodiment, the first surface 231 of the mainboard bracket 23 is in contact with the back surface 32 of the circuit board 30. The first sub-hole 301 and the second sub-hole 233 are arranged and staggered in the Y-axis direction (hole axes are not on a same straight line). There is the connection gap b between the concave part 2311 on the first surface 231 and the back surface 32, and the connection gap b extends to the first side edge 223 in the X-axis direction. An end that is of the first sub-hole 301 and that runs through the first surface 231 and an end that is of the second sub-hole 233 and that runs through the back surface

32 separately communicate with the connection gap b. It may be understood that the connection gap b is located in an area generated through staggering between the first sub-hole 301 and the second sub-hole 233. In this embodiment, in the X-axis direction, the first sub-hole 301 is closer to the first side edge 103 of the portable electronic apparatus 100 than the second sub-hole 233, that is, the first sub-hole 301 is closer to the first side edge 223 of the frame 22 than the second sub-hole 233.

The noise-canceling microphone 40 is mounted on the front surface 31 of the circuit board 30, and communicates the first sub-hole 301. An end that is of the first sub-hole 301 and that runs through the front surface 31 is a sound output end. In other words, in the Y direction, the mainboard bracket 23 is located between the circuit board 30 and the camera assembly 50. That is, the sound pickup hole 60 includes the sound receiving end 61, the sound pass-through gap a, the third sub-hole 16, the second sub-hole 233, the connection gap b, the first sub-hole 301, and the sound output end located on the first sub-hole 301. A sound pickup path of the noise-canceling microphone 40 is a curve, namely, an extension path of the sound pickup hole 60. An external sound source of the mobile phone enters the sound pickup hole 60 by using the sound receiving end 61, and propagates to the microphone by using the sound output end, to achieve noise canceling. It may be understood that the sound receiving end 61 is located at one end of the sound pass-through gap a and runs through the outer surface 111, the sound output end is one end of the first sub-hole 301, the sound pass-through gap a, the third sub-hole 16, the second sub-hole 233, the connection gap b, the first sub-hole 301, and the sound output end are located inside the main body A, axial directions of the first sub-hole 301, the second sub-hole 233, and the third sub-hole 16 are parallel to a thickness direction of the portable electronic apparatus, both the third sub-hole 16 and the second sub-hole 233 are staggered from the first sub-hole 301, and the connection gap b and the sound pass-through gap a extend in the width direction of the portable electronic apparatus towards the first side edge. The sound pickup hole 60 in this embodiment is not limited to a hole that needs to pass through a board, and gaps between the middle frame 21, the circuit board 30, the mainboard bracket 23, and the rear housing are also used. This simplifies a structure and further facilitates formation of the sound pickup hole.

It should be noted that a part of spring plates 35 of the circuit board 30 are located between the circuit board 30 and the mainboard bracket 23, and rebound force of the spring plate 35 in a direction away from the circuit board 30 abuts against the blocking wall 2320 and the cantilever 235, to produce specific abutting force on the mainboard bracket 23 in the direction away from the circuit board. Because the circuit board 30 and the mainboard bracket 23 are thread-connected by using the screw, the circuit board 30 and the mainboard bracket 23 are locked relative to each other in the Y-axis direction. In addition, the clamping buckle 236 extends into the clamping slot 225 of the frame 22 to be clamped with the clamping slot 225, and clamping force is also generated in the Y-axis direction. The blocking wall 2320 transfers the rebound force of the spring plate 35 to the clamping buckle 236 and the screw by using the body 230, and then transfers the rebound force to the middle frame 21 and the frame 22 by using the clamping buckle 236 and the screw. In addition, limiting directions of the clamping buckle 236 and the screw are both the Y-axis direction. Therefore, a press-fitting sealing effect of the mainboard bracket 23 and the circuit board 30 is not affected by the rebound force of the spring plate. In this way, the abutting force of the spring plate 35 against the mainboard bracket 23 is offset, and press-fitting force between the mainboard bracket 23 and the circuit board 30 can be increased, to improve a sealing effect of the connection gap b of the sound pickup hole 60, and prevent a sound pickup effect from being affected by sound leakage of the connection gap b.

In addition, the hollowed-out area C is formed at a position that is on the blocking wall 2320 and that is close to the second sub-hole 233, and the rebound force generated by the spring plate 35 against the blocking wall 2320 bypasses the hollowed-out area and acts on the cantilever 235. Therefore, direct impact of the rebound force of the spring plate 35 on sealing performance of the second sub-hole 233 may be reduced. That is, the elastic force of the spring plate pushes the blocking wall in the direction away from the circuit board 30. Because the hollowed-out area and the second sub-hole 233 are spaced apart in the width direction of the portable electronic apparatus, and the screw and the clamping buckle 236 are located on two opposite sides of the second sub-hole 233, the elastic force bypasses the hollowed-out area and is transferred along the cantilever 235 to both side positions of the hollowed-out area, so that the elastic force can be decomposed by using the screw and the clamping buckle, to further reduce reaction force on the mainboard bracket, so as to ensure sealing performance of the connection gap b and the second sub-hole 233, thereby ensuring a sound pickup effect.

In this embodiment, the camera assembly 50 is mounted on the main body A, and is located at a position of an upper left corner of the rear housing 10, that is, is located in an upper left corner of the back of the portable electronic apparatus 100. In the Z-axis direction (the length direction of the mobile phone), a distance Li between the sound pickup hole 60 and the first end edge 221 is less than a distance between the sound pickup hole 60 and the second end edge 222 (not shown in the figure). In the X-axis direction, a distance L3 between the sound pickup hole 60 and the first side edge 223 is less than a distance between the sound pickup hole 60 and the second side edge 224 (not shown in the figure). A boundary of the sound pickup hole 60 is based on as an entire area in which the sound pickup hole 60 is located. The sound pickup hole 60 is located between the camera module 50A of the camera assembly 50 and the first side edge 223. It may be understood that the sound pickup hole 60 is located on an edge position of the circuit board 30 and an edge position of the mobile phone. Because the sound pickup hole 60 passes through the rear housing 10, the mainboard bracket 23, the circuit board 30, and the camera module bracket 52, and there are a large quantity of elements and spring plates 35 on the circuit board 30, the sound pickup hole 60 is disposed on the edge of the circuit board 30, instead of the middle position thereof or on a side that is of the camera assembly and that is close to the middle, so that there is no need to dispose a part of sound pickup holes at the middle position of the circuit board. This further facilitates layout and design of electronic elements on the circuit board 30, reduces use of internal space of the main body, and improves utilization of the circuit board.

The foregoing descriptions are only some embodiments and implementations of this application, and are not intended to limit the protection scope of this application. Any variation or replacement readily figured out by a person skilled in the art within the technical scope disclosed in the present application shall fall within the protection scope of this application. Therefore, the protection scope of this application shall be subject to the protection scope of the claims.

The invention claimed is:

1. A portable electronic apparatus, comprising a main body, a camera module, a noise-canceling microphone, and a sound pickup hole, wherein the main body comprises a first side edge, a second side edge, and an outer surface, the first side edge and the second side edge are located on two opposite sides of the outer surface, the camera module is mounted on the main body and is exposed on the outer surface, the main body comprises a circuit board, and the noise-canceling microphone is mounted on the circuit board;

wherein the sound pickup hole comprises a sound receiving end and a sound output end, the sound receiving end runs through the outer surface, the sound receiving end is located on one side position of the outer surface and is closer to the first side edge than the second side edge, and the sound output end is disposed on the circuit board and communicates with a sound output hole of the noise-canceling microphone;

wherein the sound pickup hole is located between the camera module and the first side edge in a width direction of the portable electronic apparatus, and a distance from the sound pickup hole to the first side edge is less than a distance from the sound pickup hole to the second side edge;

wherein the sound pickup hole comprises the sound receiving end, a sound pass-through gap, a third sub-hole, a second sub-hole, a connection gap, a first sub-hole, and the sound output end, and wherein the sound receiving end, the sound pass-through gap, the third sub-hole, the second sub-hole, the connection gap, the first sub-hole, and the sound output end are sequentially communicated to form a hole structure that extends curvilinearly; and wherein the sound receiving end is located at one end of the sound pass-through gap and runs through the outer surface, the sound output end is one end of the first sub-hole, wherein the sound pass-through gap, the third sub-hole, the second sub-hole, the connection gap, the first sub-hole, and the sound output end are located inside the main body, axial directions of the first sub-hole, the second sub-hole, and the third sub-hole are parallel to a thickness direction of the portable electronic apparatus, both the third sub-hole and the second sub-hole are staggered from the first sub-hole, and the connection gap and the sound pass-through gap extend in the width direction of the portable electronic apparatus towards the first side edge.

2. The portable electronic apparatus according to claim 1, wherein the main body comprises a middle frame, a frame surrounding a peripheral edge of the middle frame, and a mainboard bracket, the first sub-hole runs through the circuit board, the second sub-hole runs through the mainboard bracket, and the connection gap is located between the mainboard bracket and the circuit board;

wherein a clamping slot is concavely disposed on an inner side surface that is of the frame and that faces the mainboard bracket, a clamping buckle is disposed on the mainboard bracket, the clamping buckle is adjacent to the second sub-hole, and the clamping buckle extends in the width direction of the portable electronic apparatus; and wherein the circuit board is disposed between the middle frame and the mainboard bracket, and the clamping buckle is clamped with the clamping slot.

3. The portable electronic apparatus according to claim 2, wherein a connection hole is disposed on the mainboard bracket, the clamping buckle and the connection hole are respectively located on two opposite sides of the second sub-hole, a hole axis of the connection hole extends in a thickness direction of the portable electronic apparatus, and the connection hole is connected with a screw to fixedly connect the circuit board and the mainboard bracket.

4. The portable electronic apparatus according to claim 3, wherein a spring plate is disposed on the circuit board, and the spring plate is adjacent to the first sub-hole;

wherein the mainboard bracket comprises a body and a blocking wall, the second sub-hole runs through two opposite surfaces of the body, the clamping buckle is located on one side of the body, and the blocking wall is disposed on the other side of the body and is opposite to the clamping buckle at an interval; and wherein a cantilever is disposed on the blocking wall, a connection part between the cantilever and the body is a hollowed-out area, the hollowed-out area and the second sub-hole are spaced apart in the width direction of the portable electronic apparatus, the clamping buckle and the connection hole are respectively relatively opposite to blocking walls on two sides of the hollowed-out area at an interval, and the spring plate elastically abuts between the blocking wall and the circuit board.

5. The portable electronic apparatus according to claim 4, wherein the body comprises a first surface and a second surface that faces away from the first surface, a groove is concavely disposed on the second surface, the second sub-hole runs through a groove bottom wall of the groove, and the groove communicates with the hollowed-out area and is used to accommodate a sealing foam.

6. The portable electronic apparatus according to claim 5, wherein a concave part is disposed on the first surface, the second sub-hole runs through a bottom of the concave part, the concave part and the groove overlap at least partially in the thickness direction of the portable electronic apparatus, and the connection gap is formed between the bottom of the concave part and a surface of the circuit board.

7. The portable electronic apparatus according to claim 4, wherein the main body comprises a rear housing mounted on the middle frame, the rear housing comprises a housing body and a cover plate covering the housing body, the sound receiving end runs through a side edge of the cover plate, the sound pass-through gap is formed between the cover plate and an outer surface of the housing body in the thickness direction of the electronic apparatus, and the sound pass-through gap communicates with the sound receiving end.

8. The portable electronic apparatus according to claim 7, wherein a bracket is disposed on a surface that is of the housing body and that faces away from the outer surface, the bracket supports the camera module, the third sub-hole runs through the housing body and the bracket in the thickness direction of the electronic apparatus, one end of the third sub-hole is connected to the second sub-hole, and the other end thereof is connected to the sound pass-through gap.

9. A portable electronic apparatus, comprising a middle frame, a frame surrounding a peripheral edge of the middle frame, a circuit board, a mainboard bracket, a noise-canceling microphone, and a sound pickup hole;

wherein the circuit board comprises a front surface and a back surface, and a spring plate is disposed on the back surface;

wherein the sound pickup hole comprises a first sub-hole, a connection gap, and a second sub-hole that are sequentially communicated, the first sub-hole runs through the front surface and the back surface and is adjacent to the spring plate, and the second sub-hole runs through the mainboard bracket;

wherein a clamping buckle and a connection hole are disposed on the mainboard bracket, the clamping buckle and the connection hole are respectively located on two opposite sides of the second sub-hole, the clamping buckle extends in a width direction of the portable electronic apparatus, a hole axis of the connection hole extends in a thickness direction of the portable electronic apparatus, and a clamping slot is concavely disposed on an inner side surface that is of the frame and that faces the mainboard bracket; and wherein the noise-canceling microphone is mounted on the front surface of the circuit board and communicates with one end of the first sub-hole, the circuit board is disposed between the middle frame and the mainboard bracket, the connection gap is formed between the mainboard bracket and the circuit board, the spring plate elastically abuts between the circuit board and the mainboard bracket, the clamping buckle is clamped with the clamping slot, and the connection hole is connected with a screw to fixedly connect the circuit board and the mainboard bracket.

10. The portable electronic apparatus according to claim 9, wherein the mainboard bracket comprises a body and a blocking wall, the second sub-hole runs through two opposite surfaces of the body, the clamping buckle is located on one side of the body, and the blocking wall is disposed on the other side of the body, and is opposite to the clamping buckle at an interval; and wherein a cantilever is disposed on the blocking wall, a connection part between the cantilever and the body is a hollowed-out area, the hollowed-out area and the second sub-hole are spaced apart in the width direction of the portable electronic apparatus, the clamping buckle and the connection hole are respectively relatively opposite to blocking walls on two sides of the hollowed-out area at an interval, and the spring plate elastically abuts between the blocking wall and the circuit board.

11. The portable electronic apparatus according to claim 10, wherein the body comprises a first surface and a second surface that faces away from the first surface, a groove is concavely disposed on the second surface, the second sub-hole runs through a groove bottom wall of the groove, and the groove communicates with the hollowed-out area and is used to accommodate a sealing foam.

12. The portable electronic apparatus according to claim 11, wherein a concave part is disposed on the first surface, the second sub-hole runs through a bottom of the concave part, the concave part and the groove overlap at least partially in the thickness direction of the portable electronic apparatus, and the connection gap is formed between the bottom of the concave part and a surface of the circuit board.

13. The portable electronic apparatus according to claim 12, wherein the sound pickup hole comprises a sound receiving end and a sound pass-through gap, a main body comprises a rear housing mounted on the middle frame, the rear housing comprises a housing body and a cover plate covering the housing body, the sound receiving end runs through a side edge of the cover plate, the sound pass-through gap is formed between the cover plate and an outer surface of the housing body in the thickness direction of the electronic apparatus, and the sound pass-through gap communicates with the sound receiving end.

14. The portable electronic apparatus according to claim 13, wherein the sound pickup hole comprises a third sub-hole, a bracket is disposed on a surface that is of the housing body and that faces away from the outer surface, the third sub-hole runs through the housing body and the bracket in the thickness direction of the electronic apparatus, one end of the third sub-hole is connected to the second sub-hole, and the other end thereof is connected to the sound pass-through gap.

15. The portable electronic apparatus according to claim 1, wherein the main body further comprises a first end edge and a second end edge, the first end edge and the second end edge are located on two opposite ends of the outer surface, and a distance from the sound pickup hole to the first end edge is less than a distance from the sound pickup hole to the second end edge.

16. The portable electronic apparatus according to claim 1, wherein the camera module is located at a corner position of the main body, and the sound pickup hole is disposed on a side of the camera module such that noise canceling is achieved when the camera module performs video recording.

17. The portable electronic apparatus according to claim 9, wherein the first sub-hole and the second sub-hole are staggered such that hole axes of the first sub-hole and the second sub-hole are not on a same straight line, and the connection gap is located in an area generated through staggering between the first sub-hole and the second sub-hole.

18. The portable electronic apparatus according to claim 10, wherein the mainboard bracket comprises an extension arm connected to the body, and the extension arm and the body surround an avoidance groove configured to avoid a camera assembly mounted on the main body.

19. The portable electronic apparatus according to claim 9, wherein the first sub-hole is located at a side edge position of the circuit board, and the first sub-hole is closer to a first side edge of the frame than the second sub-hole in the width direction of the portable electronic apparatus.

20. The portable electronic apparatus according to claim 7, wherein a connection edge is disposed on a peripheral edge of the cover plate through bending, and a notch is disposed on the connection edge.

* * * * *